(12) United States Patent
Falaschi et al.

(10) Patent No.: US 10,527,100 B2
(45) Date of Patent: Jan. 7, 2020

(54) SEALING DEVICE FOR A ROLLING BEARING

(71) Applicant: Aktiebolaget SKF, Gothenburg (SE)

(72) Inventors: Fabio Falaschi, Carrara (IT); Fausto Baracca, Massa (IT); Alessio Nebbia Colomba, Viareggio (IT)

( * ) Notice: Subject to any disclaimer, the term of this patent is extended or adjusted under 35 U.S.C. 154(b) by 1 day.

(21) Appl. No.: 16/020,523

(22) Filed: Jun. 27, 2018

(65) Prior Publication Data

US 2019/0010989 A1    Jan. 10, 2019

(30) Foreign Application Priority Data

Jul. 7, 2017   (IT) .......................... 102017000076771

(51) Int. Cl.
| | | |
|---|---|---|
| F16C 19/06 | (2006.01) | |
| F16J 15/447 | (2006.01) | |
| F16C 33/78 | (2006.01) | |
| F16C 33/80 | (2006.01) | |

(52) U.S. Cl.
CPC ............ *F16C 33/782* (2013.01); *F16C 19/06* (2013.01); *F16C 33/7853* (2013.01); *F16C 33/7863* (2013.01); *F16C 33/7886* (2013.01); *F16C 33/80* (2013.01); *F16J 15/447* (2013.01); *F16C 33/805* (2013.01)

(58) Field of Classification Search
CPC .......................... F16C 33/782; F16C 33/7853; F16C 33/7869; F16C 33/7886; F16C 33/80; F16C 33/805; F16C 19/06; F16J 15/447; F16J 15/4476; F16J 15/4478
See application file for complete search history.

(56) References Cited

U.S. PATENT DOCUMENTS

| | | | | | |
|---|---|---|---|---|---|
| 5,025,917 A | * | 6/1991 | Smith | ..................... | B65G 39/09 198/842 |
| 5,028,054 A | * | 7/1991 | Peach | ..................... | B65G 39/09 277/348 |
| 5,074,408 A | * | 12/1991 | Smith | ..................... | B65G 39/09 198/842 |
| 5,383,549 A | * | 1/1995 | Mayer | ..................... | B65G 39/09 198/842 |
| 6,287,014 B1 | * | 9/2001 | Salla | ..................... | B65G 39/09 193/37 |
| 6,385,849 B1 | * | 5/2002 | Bryant, Jr. | ............. | B65G 39/09 29/430 |

(Continued)

FOREIGN PATENT DOCUMENTS

| | | |
|---|---|---|
| DE | 1008061 B | 5/1957 |
| DE | 2938393 A1 | 4/1980 |

(Continued)

*Primary Examiner* — Gilbert Y Lee

(57) ABSTRACT

A sealing device for a rolling bearing having two annular screens constrained to the rings of the rolling bearing. Each annular screen having a respective seal made of an elastomer and provided with a respective first and second number of non-contacting annular sealing lips arranged obliquely with respect to an axis of symmetry of the sealing device that extend away from the axis of symmetry and define between them a winding path to hinder any entry of washing liquids or other impurities into the rolling bearing and facilitate at the same time the expulsion of washing liquids or other impurities which may have infiltrated along the path.

7 Claims, 1 Drawing Sheet

(56) References Cited

U.S. PATENT DOCUMENTS

| | | | |
|---|---|---|---|
| 6,641,512 B2 * | 11/2003 | Bryant, Jr. | ............ B65G 39/09 |
| | | | 29/895.2 |
| 6,817,769 B2 | 11/2004 | Johnson et al. | |
| 8,061,901 B2 | 11/2011 | Hosmer | |
| 8,356,941 B2 * | 1/2013 | Mason | ................ F16C 33/7813 |
| | | | 384/477 |
| 2004/0026867 A1 | 2/2004 | Adams et al. | |
| 2008/0153683 A1 * | 6/2008 | Kirkpatrick | ............ B65G 39/09 |
| | | | 492/16 |
| 2016/0076596 A1 | 3/2016 | Baracca et al. | |

FOREIGN PATENT DOCUMENTS

| | | |
|---|---|---|
| DE | 10128412 A1 | 12/2002 |
| DE | 10136169 A1 | 2/2003 |
| DE | 102008017409 A1 | 10/2009 |
| FR | 1230578 A | 9/1960 |
| JP | 2003148497 A | 5/2003 |
| JP | 2003262235 A | 9/2003 |
| JP | 2015052350 A | 3/2015 |

\* cited by examiner

SEALING DEVICE FOR A ROLLING BEARING

CROSS-REFERENCE

This application claims priority to Italian patent application no. 102017000076771 filed on Jul. 7, 2017, the contents of which are fully incorporated herein by reference.

TECHNOLOGICAL FIELD

The present invention relates to a sealing device for a rolling bearing intended to equip machines which frequently come into contact with cleaning liquids, for example intended to equip machines and plants used in the food industry, for example conveyors, as well as machines in the pharmaceutical industry which, for hygiene-related reasons, must be washed daily using pressurized jets of cleaning liquids.

BACKGROUND

As is known, the rolling bearings intended to equip machines for the food industry, for hygienic reasons, undergo very frequent washing, usually every day, plus a very thorough wash once a week, carried out using pressurized jets of cleaning/disinfecting liquid.

Owing to these frequent washing operations using cleaning liquids which have a low surface tension, the sealing lips and, eventually, the rolling bearings themselves are subject to premature wear since these cleaning liquids, when mixed with the washing water, tend to infiltrate inside the lubricating film of the bearings precisely because of their low surface tension. In order to overcome this problem, seals with high-interference contact lips have been developed, but not only does the sealing action not appear to have improved significantly, but an increase in the friction has also been noted, with a consequent greater energy consumption, in particular, with greater wear of the contact lips.

SUMMARY

The object of the present invention is to provide a sealing device for a rolling bearing which is able to safeguard the functional features of the bearings, preventing the entry inside the bearings of the external liquid contaminates and in particular cleaning liquids, without at the same time increasing the friction.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
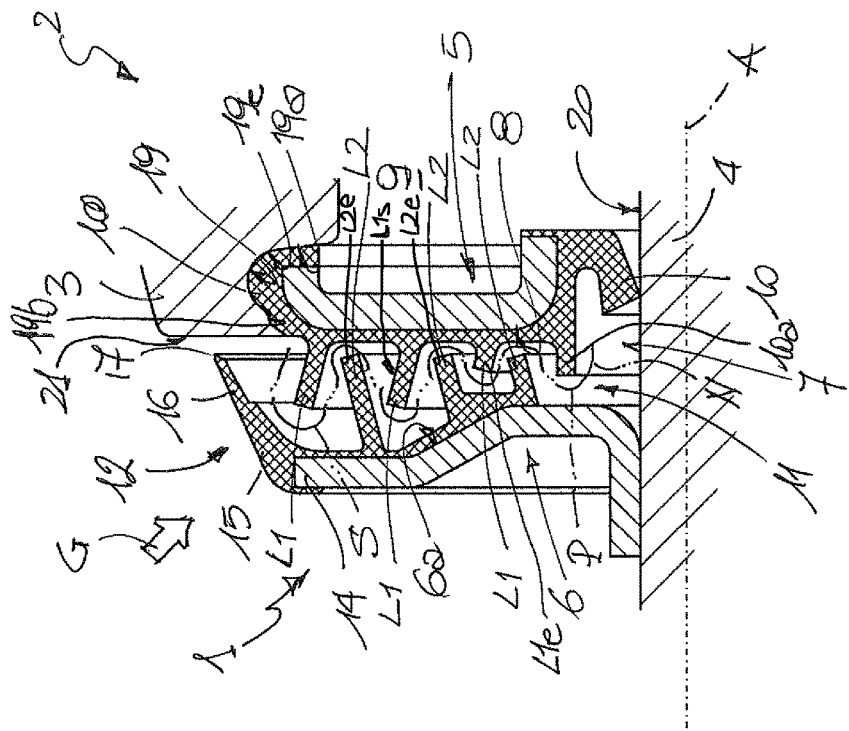
FIG. 1 shows in schematic form a radially sectioned view of a rolling bearing and the associated sealing device provided in accordance with a first preferred embodiment of the invention.

With reference to FIG. 1, 1 denotes in its entirety a sealing device for a rolling bearing 2. The rolling bearing 2 comprises a first ring 3, in the example shown the outer ring 3, a second ring 4, in the example shown in the inner ring 4 and the sealing device 1, arranged between the inner ring 4 and outer ring 3.

The sealing device 1 comprises:

a first annular screen 5 made of sheet metal material and designed to be constrained during use to the outer ring 3, and a second annular screen 6, also made of sheet metal, arranged facing the first screen 5 and designed to be constrained during use to the inner ring 4.

The sealing device 1 further comprises:

a first seal 7 made of an elastomer and integrally mounted on a first side 8 of the first screen 5 directed towards the second screen 6 and on the opposite side to an inner annular chamber 9 of the bearing 2 defined between the rings 3 and 4; the seal 7 has at least one sliding-contact annular sealing lip intended to make contact, during use, with the inner ring 4; and a second seal 11 which is made of an elastomer, is integrally mounted on a second side 6a of the second screen 6 and comprises, in turn, at least one first non-contacting annular sealing lip 12.

The first non-contacting annular sealing lip 12 is designed to cooperate, during use, with the first ring or outer ring 3 of the rolling bearing 2 and extends projecting from a radially outer peripheral edge 14 of the second screen 6; the annular lip 12 is elastically deformable since it is completely free from a rigid casing such as that consisting of the screen 6 and is formed so that it may flex during use towards the first screen 5 and consequently towards and against the outer ring 3 when the screen 6 and the associated lip 12 are acted on by an external stress directed towards the bearing 2, in the case in question when the screen 6 is acted on by a jet of liquid G indicated overall by the arrow in FIG. 1, for example a pressurized jet G of a washing liquid containing a surface-active cleaning agent.

The first non-contacting annular lip 12 is formed as a frustoconical toroid which extends axially and radially projecting from the peripheral edge 14, tapering gradually, and comprises an elastically flexible first portion 15, which extends obliquely projecting directly from the peripheral edge 14, and a second portion 16 which, in the example shown, tapers towards a free end 17 thereof which, during use, is designed to remain axially spaced from the outer ring 3 of the rolling bearing 2 in the undeformed condition of the portions 15 and 16, but to make contact axially with the ring 3 when the annular lip 12 is flexed towards the screen 5.

The first non-contacting annular lip 12 is arranged, as a whole, obliquely with respect to a common axis of symmetry A of the sealing device 1 and the rolling bearing 2, with respect to which the annular screen 5, 6, the annular seals 7, 11 and the rings 3 and 4 are coaxial. In particular, the first non-contacting annular lip 12, and, therefore, the portion 15 and the portion 16, are arranged obliquely with respect to the axis A so as to extend away from the axis A towards, or in the direction of, the free end 17. The free end 17 instead makes contact axially with the front surface 21 of the outer ring 3 when the first non-contacting annular lip 12 is flexed towards the first screen 5, namely when under the external thrust of the jet G of liquid the portion 15 flexes elastically towards the ring 3.

In the whole of the present description and in the claims, terms and expressions which indicate positions and directions, such as "radial", "axial" or "transverse", are to be understood as referring to the axis of symmetry A.

In the example shown, the first screen 5 is keyed inside an annular seat 19 of the outer ring 3 by means of the arrangement in between of a rubber annular cushion 100 forming part of the first seal 7 and has its annular contact lip 10 which cooperates with a radially outer side surface 20 of the inner ring 4; moreover, the second screen 6 is keyed onto the radially outer side surface 20 of the inner ring 4 outside of the annular seat 19 and towards an area outside the inner ring 4 and outer ring 3, external to the annular chamber 9 and on the opposite side to the annular chamber 9.

The annular seat 19 is defined:

in the axial direction, towards the inside of the bearing 2, by an inclined surface 19*a* ;

in the radial direction, towards the outside of the bearing 2, by a cylindrical surface 19*b* bounded axially by the surface 21; and again in the radial direction, towards the outside of the bearing 2, by a further curved surface 19*c*, or, rather a curved-evolute cylindrical surface 19*c*, which connects the inclined surface 19*a* to the cylindrical surface 19*b* .

In the example of embodiment shown in FIG. 1, the first seal 7 and the second seal 11 are provided, respectively, with a first number N1 and a second number N2 of annular sealing lips L1 and L2 which do not make contact and are arranged obliquely with respect to the axis of symmetry A so as to extend away from the axis of symmetry A and which are arranged radially alternating and axially on top of each other so as to define, starting from the first non-contacting annular lip 12, a winding and curvy path P designed to hinder any entry of washing liquids or other impurities into the bearing 2 and facilitate at the same time the expulsion of washing liquids or other impurities which may have infiltrated along the the path P.

The path P comprises, for each lip L1 and L2, a respective loop S which is axially defined, on one side, by a free end L1*e* and L2*e* of the associated lip L1 or L2 and, on the axially opposite side, by two radially adjacent lips L1, or by two radially adjacent lips L2, or by the first non-contacting annular lip 12 and a lip L1 or, finally, by the sliding-contact annular sealing lip 10 and by a lip L2. In any case, each loop S along the path P tends to be directed radially outwards from the axis of symmetry A and rests substantially radially inwards on a respective inclined upper surface L1*s* or L2*s* of the lips L1 and L2.

Owing to the configuration of the sealing device 1, i.e. owing to the configuration of the path P, the loops S which are arranged with alternate and opposite convexities, in the radial direction, relative to each other, and the inclined position relative to the axis of symmetry A of the lips L1 and L2, the sealing device 1 has proved to be surprisingly efficient in preventing or slowing down any entry into the rolling bearing 2 of liquids, such as cleaning liquids, mixed with washing water, and likewise surprisingly efficient in facilitating and accelerating the expulsion of these liquids, i.e. channeling the liquids towards the outside of the sealing device 1, preventing any entry of these liquids inside the rolling bearing 2.

In particular, it can be seen that the sealing device 1, as shown in FIG. 1, from the "top part" of the rolling bearing 2, i.e. from the part of the rolling bearing 2 which, during use, remains vertically above the axis of symmetry A, the path P is defined by the configuration of the lips L1 and L2, namely the loops S, so as to substantially "rise up" immediately from the first lip L2 closest to the first non-contacting annular lip 12. Namely, in the "top part" where gravity would favor the entry of liquids, the lips L1 and L2 and the loops S make it particularly difficult for any liquid which may have infiltrated beyond the first non-contacting annular lip 12 to flow along the path P. The configuration of the loops S along the path P is necessarily determined by the inclined arrangement relative to the axis of symmetry A of the lips L1 and L2, each of which, in the the "top part" of the rolling bearing 2, behaves in the manner of a gutter for deviating and slowing down the flow of any liquid which may have infiltrated beyond the first non-contacting annular lip 12.

On the other hand, however, viewing the sealing device 1 from the "bottom part" of the rolling bearing 2, i.e. from the part of the rolling bearing 2 which, during use, remains vertically below the axis of symmetry A, the path P is defined by the configuration of the lips L1 and L2, namely the loops S, so as to substantially "descend" immediately from the lip L1 closest to the sliding-contact annular sealing lip 10. Namely, in the "bottom part" where the gravity would favor already the expulsion of the liquids, the lips L1 and L2 and the loops S make it even easier for the any liquid which may have infiltrated beyond the first non-contacting annular lip 12 to pass along the path P, and the same configuration in the manner of a deviation gutter, but turned upside down, allows the liquids to be channeled even more rapidly outside of the sealing device 1, preventing furthermore any entry of these liquids inside the rolling bearing 2.

In the preferred embodiment of the sealing device 1 shown in FIG. 1, the first seal 7 and the second seal 11 are provided, respectively, with an equal number N1 and N2 of annular sealing lips L1 and L2 which do not make contact. In particular, both the first seal 7 and the second seal 11 are each provided with three non-contacting annular sealing lips L1 and L2 where the lips L1 have an axial length substantially similar to each other, while the central lip L2 of the three lips L2 has an axial length smaller than an axial length of the other two lips L2. In some alternative embodiments not shown of the sealing device 1 described above, where the radial dimensions of the rolling bearing 2 allow it, both the first seal 7 and the second seal 11 may be each provided with more than three non-contacting annular sealing lips L1 and L2 which will define an even longer path P with even more loops S.

The preferred embodiment of the sealing device 1 shown in FIG. 1 is particularly advantageous for being used where the axial space in the rolling bearing 2 does not have excessive constraints, namely where the distance between the inclined surface 19*a* and the surface 21—the distance being substantially covered by the cylindrical surface 19*b* and the curved-evolute cylindrical surface 19*c*—defines an axial space with dimensions which are in any case considerable and suitable for mounting a sealing device 1 without too many structural and functional limitations.

In this case the first seal 7 moreover has an annular sealing lip 10*a* not making sliding contact and intended to cooperate, during use, with the annular sealing lip 10 which makes sliding contact so as to create along the path P a further loop N in the vicinity of the second ring 4. The annular sealing lip 10*a* not making contact is, in the example of embodiment shown in FIG. 1, incorporated substantially in the annular sealing lip 10 making sliding contact so as to impart, among other things, even greater rigidity to the the sliding-contact annular sealing lip 10. The loop N is arranged in a position very close to the ring 4 and is designed to make even more difficult—to the point of preventing it entirely—any entry of liquids or other impurities into the rolling bearing 2.

Figure 2:
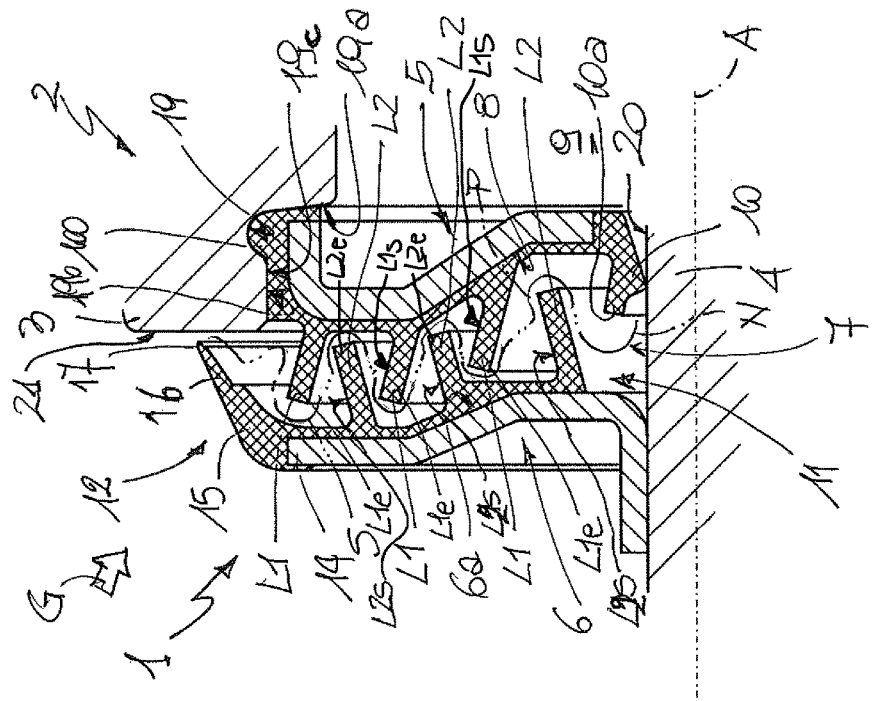
FIG. 2 shows in schematic form a radially sectioned view of a rolling bearing and the associated sealing device provided in accordance with a second preferred embodiment of the invention.

FIG. 2 shows a sealing device 1' substantially similar to the sealing device 1, from which the sealing device 1' differs in that the distance between the inclined surface 19*a* and the surface 21, i.e. the axial length of the cylindrical surface 19*b*, defines an axial space with smaller dimensions such that a sealing device 1' with a number of dimensional restrictions must be mounted, but without affecting the sealing efficiency and capacity. For this purpose, in fact, using for the sealing device 1' the same reference numbers as for the sealing device 1, the annular sealing lip 10a not making sliding contact is no longer incorporated in the annular sealing lip 10 which makes sliding contact, but is completely separate, and the annular sealing lip 10 making sliding contact has a larger thickness and also defines with the first annular screen 5 an annular cavity 40 designed to collect any liquids which may have been able to pass beyond the last loop N and convey these liquids towards the the "bottom part" of the rolling bearing 2, facilitating expulsion thereof.

Moreover, in the alternative example of the sealing device 1' shown in FIG. 2, the first seal 7 and the second seal 11 again each have three non-contacting annular sealing lips L1 and L2, the lips L2 however having an axial length decreasing in the direction towards the axis of symmetry A. In fact, in order to keep at least the geometrical configuration of the second annular screen 6 unchanged for the purposes of limiting the production costs of the sealing device 1 and 1' in the embodiments described here, it is necessary to reduce the axial length of the lips L2 also in order to keep unchanged the position of the second annular screen 6 on the inner ring 4; which position otherwise would in fact affect the external dimensions of the rolling bearing 2.

Despite the gradual reduction in the radial direction of the axial length of the lips L2, the sealing device 1' has the same sealing capacity as the sealing device 1 described above and, in fact, the path P remains winding and has the same loops S as in the sealing device 1.

It is understood that the invention is not limited to the embodiments described and illustrated here which are to be regarded as examples of embodiment of the sealing device; persons skilled in the art may be able to make various changes to the functions and the configuration of the elements described in the example of embodiment, without thereby departing from the scope of the invention as defined in the accompanying claims and in the equivalents thereof.

For example, both the sealing device 1 and the sealing device 1', in order to increase further the sealing capacity in the case of an even more severe environmental operating conditions, may also have two sliding-contact annular sealing lips 10 intended to make contact, during use, with the inner ring 4. FIGS. 1 and 2 show a single sliding-contact annular sealing lip 10, but if there were two sliding-contact annular sealing lips 10, these could for example extend in axially opposite directions from the first annular screen 5 and could for example have thicknesses smaller than the thicknesses of the single sliding-contact annular sealing lip 10 described above with the aim again of not increasing the sliding contact friction.

This aim is moreover definitely achieved by using the above-described non-contacting annular sealing lips L1 and L2 which do not come into contact with each other in any way and solely ensure with their form and layout that the path P remains winding and curvy at the inlet, but not at the exit outlet, as explained and described in detail above.

What is claimed is:

1. A sealing device for a rolling bearing, comprising:
    a first annular screen constrained to a first ring of the rolling bearing,
    a second annular screen arranged facing the first annular screen constrained to a second ring of the rolling bearing,
    a first seal made of an elastomer and mounted integrally on a first side of the first annular screen directed towards the second annular screen, the first seal being provided with a sliding-contact annular sealing ring intended to make contact with the second ring of the rolling bearing, and
    a second seal made of an elastomer and mounted integrally on a second side of the second annular screen directed towards the first screen, the second seal providing a first non-contacting annular sealing lip configured to cooperate with the first ring of the rolling bearing, and in combination:
    i) the first seal being provided with a first number of non-contacting annular sealing lips arranged obliquely with respect to an axis of symmetry of the sealing device to extend away from the axis of symmetry,
    ii) the second seal is provided with a second number of non-contacting annular sealing lips arranged obliquely with respect to the axis of symmetry of the sealing device to extend away from the axis of symmetry, and
    iii) the annular sealing lips of the first number of non-contacting annular sealing lips of the first seal are arranged radially alternating and axially above the annular sealing lips of the second number of non-contacting annular sealing lips of the second seal to define, between them and starting from the first non-contacting annular lip a winding path to hinder any entry of washing liquids or other impurities into the rolling bearing and facilitate at the same time the expulsion of washing liquids or other impurities which may have infiltrated along the path.

2. The sealing device according to claim 1, wherein the first non-contacting annular sealing lip extends projecting from a peripheral edge of the second annular screen and is elastically deformable so as to flex towards the first annular screen when the second annular screen is acted on by a jet of liquid, wherein
    the first non-contacting annular lip comprises a first portion that extends projecting radially from the peripheral edge of the second screen and a second portion defining a free end configured to remain axially spaced from the first ring of the rolling bearing and to make contact axially with the first ring of the rolling bearing when the first annular lip is flexed towards the first annular screen,
    the second portion of the first non-contacting annular lip is arranged obliquely with respect to an axis of symmetry of the sealing device so as to extend away from the axis of symmetry towards its free end.

3. The sealing device according to claim 1, wherein the path comprises a plurality of loops that have alternate and opposite convexities, in the radial direction, relative to each other; each loop being defined by a respective annular sealing lip of the first and second number of non-contacting annular sealing lips.

4. The sealing device according to claim 3, wherein each loop is bounded, radially towards the inside, by a respective surface arranged obliquely with respect to the axis of symmetry so as to extend away from the axis of symmetry towards a free end of the respective non-contacting annular sealing lip.

5. The sealing device according to claim 4, wherein the first seal has an annular sealing lip not making sliding contact, configured to cooperate with the annular sealing lip that makes sliding contact to create a loop proximate the second ring of the rolling bearing, the nearby loop preventing further any entry of washing liquids or other impurities into the rolling bearing.

6. The sealing device according to claim 5, wherein the annular sealing lip not making sliding contact is incorporated substantially in the annular sealing lip that makes sliding contact.

7. The sealing device according to claim 5, wherein the annular sealing lip not making sliding contact is separate from the annular sealing lip that makes sliding contact.

* * * * *